No. 686,174. Patented Nov. 5, 1901.
W. WILDMAN.
DISK HARROW.
(Application filed Jan. 15, 1901.)
(No Model.)
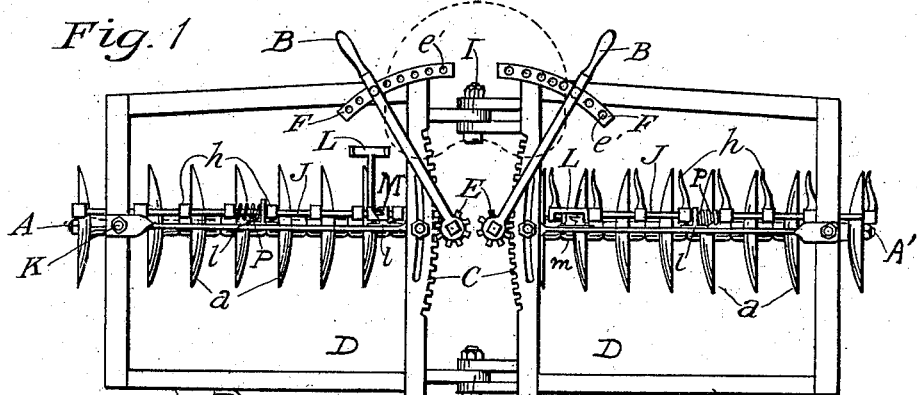
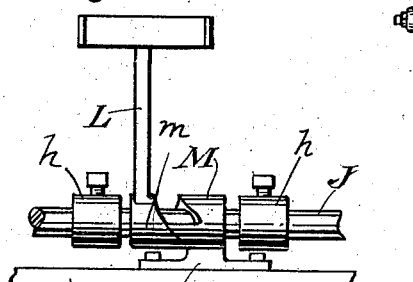
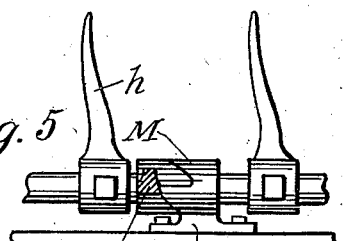
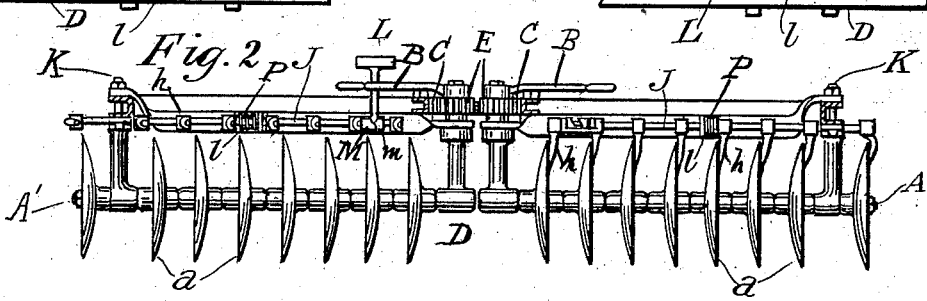
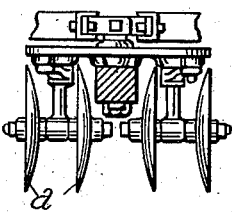
Witnesses
B. W. Pierce
Mattie McGinnis
Inventor
Wm Wildman
by Hazard & Harpham
Attorneys

UNITED STATES PATENT OFFICE.

WILLIAM WILDMAN, OF SPADRA, CALIFORNIA, ASSIGNOR OF ONE-HALF TO R. M. FURLONG, OF PASADENA, CALIFORNIA.

DISK HARROW.

SPECIFICATION forming part of Letters Patent No. 686,174, dated November 5, 1901.

Application filed January 15, 1901. Serial No. 43,415. (No model.)

*To all whom it may concern:*

Be it known that I, WILLIAM WILDMAN, a citizen of the United States, residing at Spadra, in the county of Los Angeles, State of California, have invented new and useful Improvements in Disk Harrows, of which the following is a specification.

My improvement consists in a harrow having three parts, the main or rear portion of the harrow being divided into the two parts having a series of saucer-shaped disks on two main shafts mounted in frames pivotally connected together, the third or central part comprising a plurality of like-shaped disks swively mounted in the frame in advance of the two main portions and at the butt-end of the tongue and adapted to cultivate the center strip of ground not touched by the other two parts.

The object of my invention is to provide a disk harrow of simple construction which will effectively pulverize and smooth all the surface of the even or uneven ground. I accomplish this object by means of the mechanism shown in the accompanying drawings, in which—

Figure 1 is a plan of my improved harrow with the seat removed and the tongue broken away. Fig. 2 is a rear view of the main harrow. Fig. 3 is a front elevation of the central harrow, the tongue being cut away. Figs. 4 and 5 are views of the mechanism for shifting the disk scrapers, the actuating-lever L being shown in different positions.

In the main frame D, composed of two parts D' D", pivotally connected in the center at I, are the two main shafts A and A', which carry disks *a*. These shafts are pivoted at their outer ends by the pivotal bolts K to the main frame. On the inner ends of the main shafts are rotatively mounted spur-gears E, arranged to mesh with the segmental racks C, the center of the segmental circle being at the locus of the pivotal bolt K. On the upper faces of the spur-gear E are square studs adapted to engage the square sockets in the ends of the handles B, by which the shafts A and A' may be swung around on their pivots at K to give the disks any angle required. The handles B (within easy access of the driver on the seat, indicated by dotted lines in Fig. 1) have a limited movement over the segmental supports F and are held in proper adjustment thereon by a pin integral with and projecting downward from each handle and adapted to fit into the holes *e'* in the segmental supports. If the range of the adjustment within the holes of the segmental supports is not sufficient, the handle can be raised off the stud on the spur-gear E, and any adjustment desired can be given. The central portion of the harrow is mounted in a manner similar to the rear or main portion and the angle of the disks thereon adjusted by means substantially the same. The disks are cleaned by the scrapers *h*, keyed to the shafts J. These shafts have a longitudinal and rotary movement in bearings *l*, affixed to the main frame. These bearings are provided with cam M, adapted to engage lugs *m* on the hub of the adjusting foot-levers L. The movement of these levers L (within easy access of the feet of the driver) will cause the scrapers to move to and engage the inner faces of the disks, and the coiled springs P will cause them to recede therefrom. The cam mechanism is plainly shown in Figs. 4 and 5. The coiled springs P encircle the shafts J, the inner ends of which springs bear against the bearings *l*, and the outer ends bear against the hubs of the scrapers. The tendency of the springs is to hold the scrapers out of engagement with the disks.

My harrow is especially adapted for use in keeping the irrigating-ditches in alfalfa-fields clean of weeds and alfalfa and in breaking the surface of the ground in these ditches after irrigating to prevent it from baking. I have found in practice that the ordinary plow will not do this work well in soil adapted for growing alfalfa, as the moldboard of the plow will not scour, but will clog up; but my disk harrow, swively connected in the middle, is peculiarly adapted to do this work. It has been customary heretofore to fill up these ditches to prevent the growing weeds and alfalfa from filling them up and to prevent the surface of the ground from baking, which it will do if left undisturbed after irrigating, and then when it is desired to irrigate again new ditches have to be made; but it is not necessary to fill up these ditches where my harrow is used, as the harrow will destroy the weeds and grass and break up the ground and prevent it from baking, and at the same time it will cause the earth forming the sides of these ditches, which are usually three feet wide and eighteen inches deep, to be carried upward along the sides of the ditches and form ridges to confine the water in the ditches, and thus the ditches can easily be kept clean and open.

Having described my invention, what I claim as new, and desire to secure by Letters Patent, is—

1. A disk harrow composed of three parts, two main rear parts and one central front part; the two rear parts being pivotally connected together, the first part being pivotally mounted on the frame in advance of the two other parts, the said parts being composed of a plurality of saucer-shaped disks, and provided with means to give the disks any angle desired.

2. In a disk harrow, the combination with the main frame D, pivotally connected together in the center thereof, the main shafts A A', pivoted at their outer ends to the main frame and having mounted thereon a plurality of disks; spur-gears E rotatively mounted on the inner end of said shafts, each of said gears being provided, on its upper face, with a square stud to engage a wrench; the said gear adapted to mesh with the segmental rack; segmental racks on said frame arranged to engage the spur-gear; a handle to rotate said spur-gear, provided with a square socket to engage the stud on the gear, and having a projecting stud for engagement with a segmental support; a segmental support having holes to receive and engage the stud on the handle, substantially as and for the purposes herein described.

3. In a disk harrow having a frame pivotally connected in the center, and two main shafts carrying disks mounted thereon, and pivotally secured at their outer ends to the frame, the herein-described segmental gear C in combination with the spur-gear E, mounted on the inner ends of the main shafts, and the handle B adapted to engage the spur-gear E; and having studs adapted to enter openings in the segmental support F; and the segmental support F having openings $e'$ therein for the reception of the stud on the handle.

4. In a disk harrow provided with two rear members, a central member comprising a plurality of disks pivotally mounted in the center of the frame and in advance of the two rear members to cultivate the center strip of ground, substantially as shown and described.

In witness that I claim the foregoing I have hereunto subscribed my name this 8th day of December, 1900.

WILLIAM WILDMAN.

Witnesses:
HENRY T. HAZARD,
G. E. HARPHAM.